United States Patent [19]

Hara

[11] Patent Number: 4,678,286
[45] Date of Patent: Jul. 7, 1987

[54] SPATIAL LIGHT MODULATOR
[75] Inventor: Tsutomu Hara, Hamamatsu, Japan
[73] Assignee: Hamamatsu Photonics Kabushiki Kaisha, Hamamatsu, Japan
[21] Appl. No.: 761,093
[22] Filed: Jul. 31, 1985
[30] Foreign Application Priority Data Aug. 17, 1984 [JP] Japan .................................. 59-171194

[51] Int. Cl.⁴ ................................................ G02F 1/03
[52] U.S. Cl. ..................................... 350/356; 350/393
[58] Field of Search .............. 350/356, 393, 387, 405, 350/356, 392; 250/213 VT

[56] References Cited

U.S. PATENT DOCUMENTS 3,499,157  3/1970  Satake et al. ................. 250/213 VT
3,702,215  11/1972  Cummins ............................. 350/393

FOREIGN PATENT DOCUMENTS 204510  12/1982  Japan .................................. 350/356
8822  1/1985  Japan .................................. 350/356
1102936  2/1968  United Kingdom ................ 350/393

Primary Examiner—William H. Punter
Attorney, Agent, or Firm—Spencer & Frank

[57] ABSTRACT

A spatial light modulator consisting of an electron beam source formed within a vacuum envelope and an electro-optic crystal assembly for storing electrons emitted from the electron beam source as a charge to change the optical property thereof. The electro-optic crystal assembly consists of a pair of electro-optic crystal plates of the same materials, i.e., $LiNbO_3$, $LiTaO_3$, or $Bi_{12}SiO_{20}$. As an example, $LiNbO_3$ is cut in such a way that the normal to its surface is located in the $(-Y, Z)$ plane and makes an angle of 55 degrees with the Z-axis. The electro-optic crystal assembly further consists of a pair of electro-optic crystal plates having different thickness which are combined through a transparent conductive film so that the surface of the thinner electro-optic crystal plate faces the electron beam.

4 Claims, 5 Drawing Figures

SPATIAL LIGHT MODULATOR

BACKGROUND OF THE INVENTION

The present invention relates to a spatial light modulator wherein an electro-optic crystal is arranged against the electron beam source within a vacuum envelope so as to store electrons emitted from the electron beam source onto the surface of the crystal, to change the refractive index corresponding to the charge stored on the crystal surface, and to read out the change in the refractive index by means of a laser beam.

The fundamental operation of the spatial light modulator will be described hereinafter.

FIG. 1 shows a schematic diagram of the spatial light modulator wherein an input optical image 1 is formed on a photoelectric layer 4 inside a glass envelope 3 of the spatial light modulator after passing through a lens 2 during illumination.

Photoelectric layer 4 emits photoelectrons responding to the input image. The photoelectrons are incident on a microchannel plate 6, after passing through an accelerating and focusing lens 5, and are multiplied by a factor of the order of thousands. The multiplied electrons, after passing through a mesh electrode 7, are stored on one surface of an electro-optic crystal 8 whose other surface is covered with a transparent film electrode 8a, made for instance of LiNbO$_3$, to change the refractive index of crystal 8 in response to the electric charge image.

When the laser beam from a laser beam source 10 is incident on crystal 8 after passing through a half mirror 9, a laser beam image 11 or a coherent image can be obtained. This image is used in many optical image processing and optical computing system.

If electro-optic crystal 8 of the spatial light modulator is relatively thick, the electric field caused by a point charge P on a surface of the electro-optic crystal 8 spreads out as shown by $\delta_1$ in FIG. 2(A).

If electro-optic crystal 8 of the spatial light modulator is relatively thin, the spreading range $\delta_2$ is much smaller than $\delta_1$, as shown in FIG. 2(B).

This electric field changes the refractive index of crystal 8 and it modulates the magnitude of the phase of the light beam sent from laser beam source 10. It can easily be understood that the resulting coherent light image has high resolution for the thinner electro-optic crystal 8.

Electro-optical crystal 8 was sliced as thin as possible with a flatness of λ/10 or better while the surfaces thereof were kept parallel with a parallelism of five seconds or less. That is, a LiNbO$_3$ single crystal plate was cut with the normal to its surface located in the (−Y,Z) plane and at an angle of 55 degrees with respect to the Z or optic axis of the crystal. The crystal, having a diameter of 25 mm, was sliced into a wafer with a thickness of 0.3 mm. A spatial light modulator of this type has a resolution of three line-pairs/mm (at a modulation factor of 50%).

The resolution of three line-pairs/mm, however, is unsatisfactory for optical image processing and optical computing, and a thinner electro-optic crystal 8 is required for higher resolution. Thinner LiNbO$_3$ single crystal plates might mechanically be distorted to such an extent that they could not be used for the above objectives.

The objective of the present invention is to provide a spatial light modulator with high resolution utilizing a very thin electro-optic crystal plate.

SUMMARY OF THE INVENTION

The spatial light modulator to accomplish the above objective of the present invention consists of an electron beam source formed within a vacuum envelope, and an electro-optical crystal assembly to store electrons emitted from the electron beam source as a charge to change the optical property thereof. The electro-optic crystal assembly consists of a pair of electro-optic crystal plates of the same material with different thickness which are combined through a transparent conductive film so that the surface of the thinner electro-optic crystal plate faces the electron beam source.

DESCRIPTION OF THE PREFERRED EMBODIMENTS

The present invention will hereafter be described in detail.

Figure 3A:
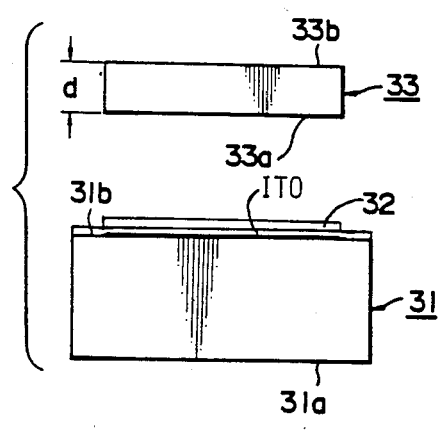
FIGS. 3(A) and 3(B) are schematic diagrams showing how to fabricate the electro-optic crystal of the spatial light modulator according to the present invention, FIGS. 3(A and 3(B) showing first and second embodiments of the electro-optic crystal, respectively.
Figure 3B:
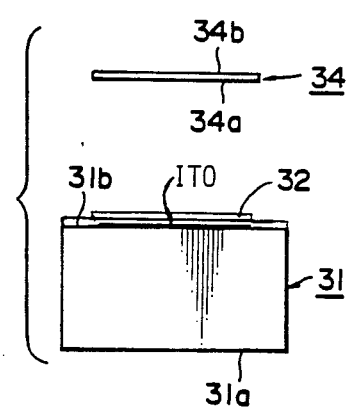

FIGS. 3(A) and 3(B) are schematic diagrams showing how to fabricate the electro-optic crystal of the spatial light modulator according to the present invention, FIGS. 3(A) and 3(B) showing the first and second embodiments of the electro-optic crystal, respectively.

Figure 1:
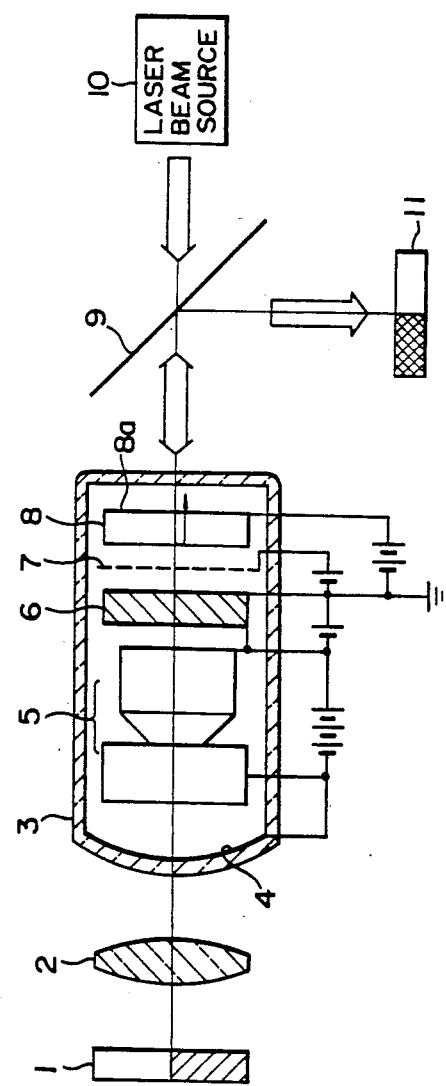
FIG. 1 is a schematic diagram for explaining the fundamental structure of the spatial light modulator.
Figure 2A:
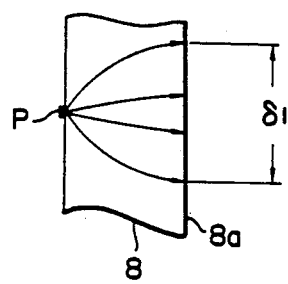
FIGS. 2(A) and 2(B) are schematic diagrams for explaining the relation between the thickness of the electro-optical crystal plate and the electric field, FIG. 2(A) showing the spreading range of the electric field in the case of a relatively thick crystal, and FIG. 2(B) showing the electric field for the case in which it is thin.
Figure 2B:
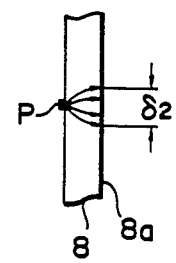

The basic configuration of the spatial light modulator is the same as that shown in FIG. 1.

In the first embodiment of the present invention to actualize the very thin electro-optic crystal, a LiNbO$_3$ single crystal plate 31 was cut with the normal to its surface at 55 degrees with respect to the Z or optic axis of the crystal. The crystal, having a diameter of 25 mm by a thickness of 10 mm, is polished so that surfaces 31a and 31b are parallel with a parallelism of five seconds or less with a flatness of λ/10 or better. Thereafter, a transparent conductive film (ITO) is deposited onto surface 31b. Another LiNbO$_3$ single crystal plate 33 cut with the normal to its surface at 55 degrees, a diameter of 20 mm and a thickness of 3 mm is polished so that surface 33a has a flatness of λ/10 or better.

Crystal plates 31 and 33 are arranged so that the crystal axes thereof conform, and they are fastened by a transparent adhesive agent 32 (i.e., epoxy resin or acrylic resin) so that surface 31b is arranged against surface 33a through the transparent conductive film.

Surface 31a which is set by mounting crystal 31 on the polishing plate is polished on the polishing plate.

Crystal 33 is ground off into a wafer with a thickness d of 50 μm so that surface 33b has a flatness of λ/10 or better with a parallelism of several seconds against surface 33a.

The flatness and parallelism of the LiNbO$_3$ single crystal plate are measured by using a flatness standard and auto-collimator to check if the flatness and parallelism are as specified before. The LiNbO$_3$ single crystal plate is then built into the vacuum envelope in accordance with the present invention. The transparent conductive film is used as an electrode which performs the same operation as that of the conventional spatial light modulator.

The spatial light modulator according to the above configuration has a resolution of 15 line pairs/mm (at a modulation factor of 50%), and this is five times superior to that of the conventional spatial light modulator. A resolution of 15 line pairs/mm is satisfactory for use in optical image processing and optical computing.

The spatial light modulator envelope with parts mounted is heated at 200° C. or more during exhausting of gases or fabrication of the photoelectric layer. Since a pair of LiNbO$_3$ single crystal plates with the same thermal expansion coefficient is used, no peel has occurred in the interface between the crystal plates.

A LiNbO$_3$ single crystal cut with the normal to its surface at 55 degrees with respect to the Z axis of the crystal is birefringent by nature, and the phase change due to the birefringent nature of crystal 33 can be compensated by applying an appropriate voltage across surfaces 31$a$ and 31$b$ of crystal 31 through the deposited transparent conductive layer ITO.

In the first embodiment of the present invention, a pair of crystal plates are fastened together by adhesive agent 32 and then these plates are polished to obtain a thin wafer. Grinding off and polishing, however, can be done by the following processes in the second embodiment:

An LiNbO$_3$ single crystal plate 31 cut with the normal to its surface at 55 degrees with respect to the Z axis of the crystal (with an allowance of several seconds), a diameter of 25 mm and a thickness of 10 mm is polished so that surfaces 31$a$ and 31$b$ thereof are parallel with a flatness of $\lambda/10$ or less. Thereafter, a transparent conductive film (ITO) is uniformly deposited onto surface 31$b$. Another LiNbO$_3$ single crystal plate 34 (FIG. 3(B)) cut with the normal to its surface at 55 degrees with respect to the Z axis of the crystal, a diameter of 20 mm and a thickness of 50 $\mu$m to 100 $\mu$m is polished so that surfaces 34$a$ and 34$b$ are parallel with a flatness of $\lambda/10$. If this thin crystal wafer is removed from the polishing jig, the wafer may be mechanically distorted. Thus, crystal plate 34 is fastened to crystal plate 31 by adhesive agent 32 so that the flatness and parallelism of crystal plates 31 and 34 are as before specified after polishing is completed.

The above descriptions have been given for LiNbO$_3$ single crystals. The LiNbO$_3$ single crystal, however, can be replaced by the other crystals, i.e., LiNbO$_3$ cut perpendicular to the Z axis thereof, LiTaO$_3$ and Bi$_{12}$SiO$_{20}$.

Although the electron beam source actualized by a photoelectric layer has been described in the present embodiments, it can be replaced by an electron gun to write a charge into the crystal structure surface within the scope of the present invention.

As described above, the electro-optic crystal structure of the spatial light modulator in accordance with the present invention consists of a pair of electro-optic single crystal plates of the same material with different thickness which are fastened together through a transparent conductive film by an adhesive agent so that the surface of the thinner crystal plate faces the photoelectric layer.

The nature of the polished thinner electro-optic crystal plate was satisfactorily and effectively used to improve the resolution of the spatial light modulator.

What is claimed is:

1. A spatial light modulator consisting an electron beam source formed within a vacuum envelope and an electro-optic crystal assembly to store electrons emitted from said electron beam source as a charge to change the optical property thereof, wherein said electro-optic crystal assembly consists of a pair of electro-optic crystal plates of the same material with different thickness combined through a transparent conductive film so that the surface of the thinner electro-optic crystal plate faces said electron beam source.

2. A spatial light modulator as claimed in claim 1, wherein said electro-optic crystal plate is made of a LiNbO$_3$ single crystal.

3. A spatial light modulator as claimed in claim 1, wherein said electro-optic crystal plate is made of LiTaO$_3$ or Bi$_{12}$SiO$_{20}$.

4. A spatial light modulator as claimed in claim 1 wherein said pair of electro-optic crystal plates are arranged so that the crystal axes thereof conform in direction.

* * * * *